United States Patent
Sarma et al.

(10) Patent No.: US 9,260,538 B2
(45) Date of Patent: Feb. 16, 2016

(54) IMMOBILIZATION OF SINGLE SITE CATALYST ON INORGANIC OXIDE SUPPORT FOR PREPARATION OF UHMWPE

(71) Applicant: Reliance Industries Limited, Mumbai, Maharashtra (IN)

(72) Inventors: Krishna Renganath Sarma, Gujarat (IN); Rakshvir Jasra, Gujarat (IN); Kayambu Kannan, Tamil Nadu (IN); Ajit Behari Mathur, Gujarat (IN); Viralkumar Patel, Gujarat (IN); Yogesh P. Patil, Gujarat (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 0 days.

(21) Appl. No.: 14/376,554

(22) PCT Filed: Jan. 8, 2013

(86) PCT No.: PCT/IN2013/000016
§ 371 (c)(1),
(2) Date: Aug. 4, 2014

(87) PCT Pub. No.: WO2013/118140
PCT Pub. Date: Aug. 15, 2013

(65) Prior Publication Data
US 2015/0005461 A1    Jan. 1, 2015

(30) Foreign Application Priority Data
Feb. 8, 2012   (IN) .......................... 361/MUM/2012

(51) Int. Cl.
*C08F 4/76*     (2006.01)
*C08F 4/52*     (2006.01)
*C08F 110/02*   (2006.01)

(52) U.S. Cl.
CPC ... *C08F 4/76* (2013.01); *C08F 4/52* (2013.01); *C08F 110/02* (2013.01)

(58) Field of Classification Search
CPC ............. C08F 4/60048; C08F 4/62048; C08F 4/64048
USPC ........................................ 526/172, 129, 130
See application file for complete search history.

(56) References Cited

U.S. PATENT DOCUMENTS

| | | | |
|---|---|---|---|
| 6,462,136 B1 | 10/2002 | Saito et al. | |
| 6,562,930 B2 | 5/2003 | Coates et al. | |
| 6,787,624 B2 | 9/2004 | Coates et al. | |
| 6,838,540 B2 | 1/2005 | Mitani et al. | |
| 6,875,718 B2 | 4/2005 | Fujita et al. | |
| 6,995,229 B2 | 2/2006 | Kashiwa et al. | |
| 7,064,096 B1 * | 6/2006 | Hoang et al. | 502/103 |
| 7,119,154 B2 | 10/2006 | Coates et al. | |
| 7,268,243 B2 | 9/2007 | Coates et al. | |
| 2008/0108763 A1 * | 5/2008 | Hoang et al. | 526/113 |

FOREIGN PATENT DOCUMENTS

| | | | | |
|---|---|---|---|---|
| EP | 0 874 005 A1 | 10/1998 | | |
| WO | WO 2010/027728 A1 * | 3/2010 | | C08F 4/64 |
| WO | 2010/139720 A1 | 12/2010 | | |
| WO | WO 2010/139720 A1 * | 12/2010 | | C08F 4/64 |
| WO | WO 2011/040753 A2 * | 4/2011 | | B01J 31/12 |

OTHER PUBLICATIONS

International Search Report of PCT/IN2013/000016, mailed Aug. 14, 2013.

* cited by examiner

*Primary Examiner* — Rip A Lee
(74) *Attorney, Agent, or Firm* — Collard & Roe, P.C.

(57) ABSTRACT

There is provided a chemically immobilized heterogeneous single site polymerization catalyst represented by Formula I.

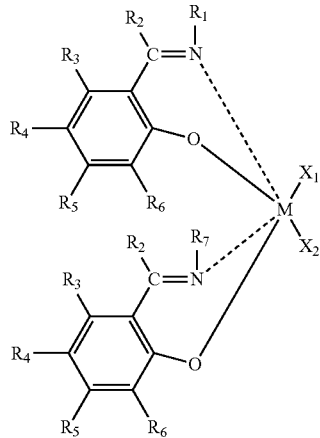

Formula I

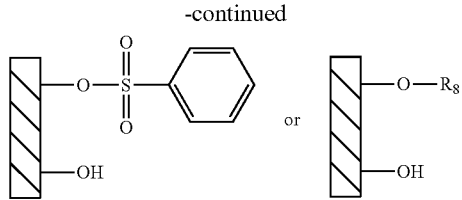

such that $R_8$ is a molecule having a carboxylic or sulphonic acid group;

$R_2$-$R_5$, are independently, H or a hydrocarbon;

$R_6$ is t-butyl;

$R_7$ is a functionalized inorganic oxide support selected from the group consisting of wherein,
M is a Group IV transition metal;
$R_1$ is

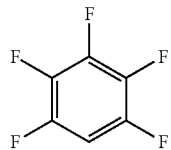 [SMILES: Fc1cc(F)c(F)c(F)c1F]

or
a functionalized inorganic oxide support selected from the group consisting of

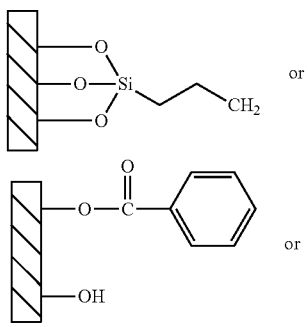

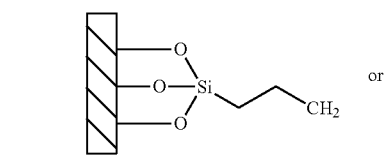

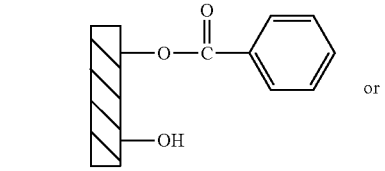

such that $R_8$ is a molecule having a carboxylic or sulphonic acid group;

and $X_1$ and $X_2$ are independently F, Cl, Br or I.

There is also provided a method for the preparation of the chemically immobilized heterogeneous single site polymerization catalyst as represented by Formula I.

15 Claims, 6 Drawing Sheets

IMMOBILIZATION OF SINGLE SITE CATALYST ON INORGANIC OXIDE SUPPORT FOR PREPARATION OF UHMWPE

CROSS REFERENCE TO RELATED APPLICATIONS

This application is the National Stage of PCT/IN2013/000016 filed on Jan. 8, 2013, which claims priority under 35 U.S.C. §119 of Indian Application No. 361/MUM/2012 filed on Feb. 8, 2012, the disclosures of which are incorporated by reference. The international application under PCT article 21(2) was not published in English.

FIELD OF THE DISCLOSURE

The present disclosure relates to a catalyst and a process for preparation thereof. Particularly, the present disclosure relates to a polymerization catalyst. More particularly, the present invention relates to a supported polymerization catalyst.

BACKGROUND

Several polymerization catalysts are known that are used for manufacture of polyolefin. Recently, group IV metals based FI catalysts (Fujita catalyst which is a phenoxy-imine based catalyst) with or without support are being widely used in the manufacture of polymers of different characteristics.

An FI catalyst is a heteroatom-coordinated early transition metal complex that combines a pair of non-symmetric phenoxy-imine [$O^-$, N] chelating ligands with a group IV transition metal. The catalytically active species derived from FI catalysts is highly electrophilic and can assume up to five isomeric structures based on the coordination of the phenoxy-imine ligand. In addition, the accessibility of the ligands of the FI catalysts and their amenability to modification offers an opportunity for the design of diverse catalytic structures.

FI Catalysts when used in conjunction with suitable co-catalysts exhibit unique polymerization catalysis. Some of the distinct advantageous features of FI catalyst when used along with appropriate co-catalysts include precise control of product molecular weights, highly iso-specific and syndio-specific propylene polymerization, regio-irregular polymerization of higher $\alpha$-olefins, highly controlled living polymerization of both ethylene and propylene at elevated temperatures, and precise control over polymer morphology. Many of the polymers that are available via the use of FI catalysts were previously inaccessible through other means of polymerization.

Polymerization of propylene or ethylene or copolymer of propylene and/or ethylene with other co monomers like conjugated diene in the presence of FI catalysts have been disclosed in U.S. Pat. No. 6,995,229, U.S. Pat. No. 6,838,540, U.S. Pat. No. 6,875,718, U.S. Pat. No. 6,462,136 and EP0874005. The FI catalysts disclosed in these patents are of both types, unsupported as well as the supported ones. The supported FI catalysts disclosed in some of these patents are directly supported. However, none of the catalysts comprise a phenyl ring with 5 fluoro substitutions that is attached to the N— of imine.

Preparation of syndiotactic polypropylene or its copolymer with ethylene or copolymer of alpha-olefins and conjugated diene in presence of FI catalyst where —N of imine is attached to —$C_6F_5$ group is described in U.S. Pat. No. 6,562,930, U.S. Pat. No. 6,787,624, U.S. Pat. No. 7,268,243 and U.S. Pat. No. 7,119,154. The FI catalysts disclosed in all these patents however are unsupported.

The hitherto known FI catalysts are either not immobilized or immobilized directly (physically) on the inorganic support which usually affects the catalyst efficiency.

OBJECTS

Some of the objects of the present disclosure are described herein below:

It is an object of the present invention to provide a FI or FI type catalyst comprising highly polar fluorine atoms.

It is another object of the present invention to provide a process for preparation of a FI or FI type catalyst comprising highly polar fluorine atoms.

It is still another object of the present invention to provide a FI or FI type catalyst that is linked to inorganic oxide support chemically through covalent and coordinate bonds, but not physically anchored on it.

It is yet another object of the present invention to provide a process for immobilizing the FI or FI type catalyst on an inorganic support chemically through the formation of covalent and coordinate bonds between the ligand and the support.

It is a further object of the present invention to provide a process to prepare disentangled ultrahigh molecular weight polyolefins by employing the FI or FI type catalyst that is chemically immobilized on an inorganic support.

Other objects and advantages of the present invention will be more apparent from the following description when read in conjunction with the accompanying figures, which are not intended to limit the scope of the present invention.

DEFINITIONS

As used in the present specification, the following words and phrases are generally intended to have the meanings as set forth below, except to the extent that the context in which they are used indicates otherwise.

Functionalizing the inorganic support means treating the —OH group containing inorganic support with an amino group containing reagent.

Functionalized inorganic support means an inorganic support that is capable of reacting with a substituted salicylaldehyde to form an immobilized phenoxy-imine based Schiff base chelating ligand.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

SUMMARY

In accordance with a first aspect of the present invention there is provided a chemically immobilized heterogeneous single site polymerization catalyst represented by Formula I.

Formula I

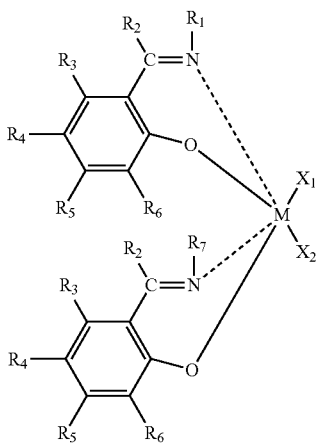

wherein,

M is a Group IV transition metal;

$R_1$ is

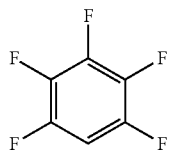

or a functionalized inorganic support selected from the group consisting of

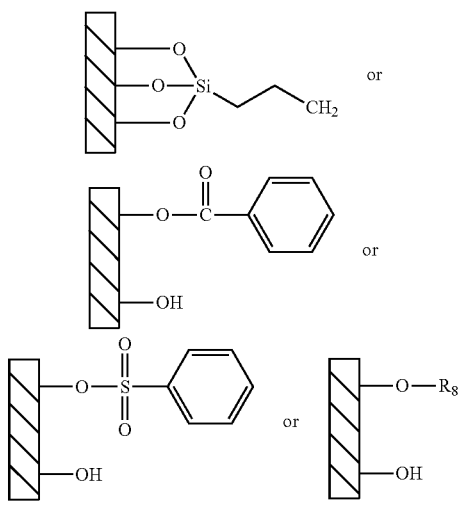

such that $R_8$ is a molecule having a carboxylic or sulphonic acid group.

$R_2$-$R_5$, are independently, H or a hydrocarbon;

$R_6$ is t-butyl;

$R_7$ is a functionalized inorganic support selected from the group consisting of

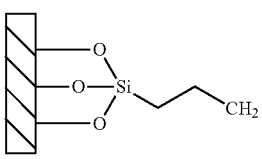

or

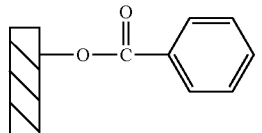

or

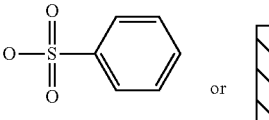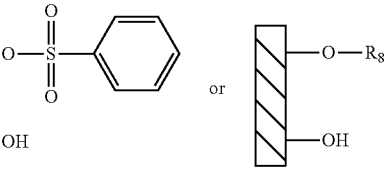

such that $R_8$ is a molecule having a carboxylic or sulphonic acid group.

And $X_1$ and $X_2$ are independently F, Cl, Br or I.

Typically, the group IV transition metal, M is titanium.

In a second aspect of the present invention there is provided a method for chemically immobilizing a single site FI or FI type catalyst on an inorganic oxide support, through covalent bonding, said method comprising the following steps:

selecting an inorganic oxide support, functionalizing the support by treating it with a reagent to obtain a chemically bonded "amino functionalized" inorganic oxide support";

treating the "amino functionalized" inorganic oxide support with a substituted salicylaldehyde to obtain an inorganic oxide support with an immobilized phenoxy-imine based Schiff base chelating ligand;

lithiating the immobilized phenoxy-imine based Schiff base chelating ligand on the inorganic oxide support by treating it with a lithiating agent to obtain an inorganic oxide support with an immobilized lithiated Schiff base chelating ligand;

treating the inorganic oxide support with immobilized lithiated Schiff base chelating ligand with a titanium halide compound to obtain an immobilized single site titanium chelate catalyst.

Typically, the inorganic oxide support is selected from the group consisting of silica, zeolite, alumina and ion exchangers.

Typically, the reagent is at least one selected from the group consisting of amino alkyl or amino aryl trialkoxy silanes and amino substituted carboxylic and sulphonic acids.

Typically, the substituted salicylaldehyde is at least one selected from the group consisting of at least one benzene ring with an ortho hydroxyl group adjacent to the aldehyde group.

Typically, the lithiating agent is selected from the group consisting of alkyl/aryl lithiums like n-butyl lithium. Other reagents like sodium hydride could also be used effectively.

Typically, the titanium halide compound is titanium tetrachloride.

In accordance with a third aspect of the present invention there is also provided a process for synthesis of ultra-high molecular weight polyethylene (UHMWPE) with a molecular weight ranging between 0.1 and 16 million gm/mole by employing the surface immobilized single site heterogeneous polymerization catalyst represented by Formula I along with a co-catalyst, said method comprising the following steps:

mixing a co-catalyst and a chemically immobilized heterogeneous single site polymerization catalyst represented by Formula I, under nitrogen or argon in an inert, dry and oxygen free hydrocarbon solvent to obtain a mixture with a predetermined Al—Ti ratio; and polymerizing ethylene in presence of the mixture in a Buchi polyclave reactor under mechanical agitation to obtain UHMWPE polymer.

Typically, the co-catalyst is at least one selected from the group consisting of Poly methylaluminoxane (P-MAO), Triethyl aluminum (TEAL), methyl aluminoxane (MAO) etc.

Typically, the Al/Ti molar ratio as derived from the co-catalyst and catalyst is at least 200.

Typically, the ethylene pressure in the reactor is maintained in the range between atmospheric pressure and about 8 bars.

Typically, the polymerization temperature is maintained in a range of about 30 to 75° C.

Typically, the hydrocarbon solvent is at least one selected from the group consisting of hexane, varsol and toluene.

DETAILED DESCRIPTION

Figure 1:
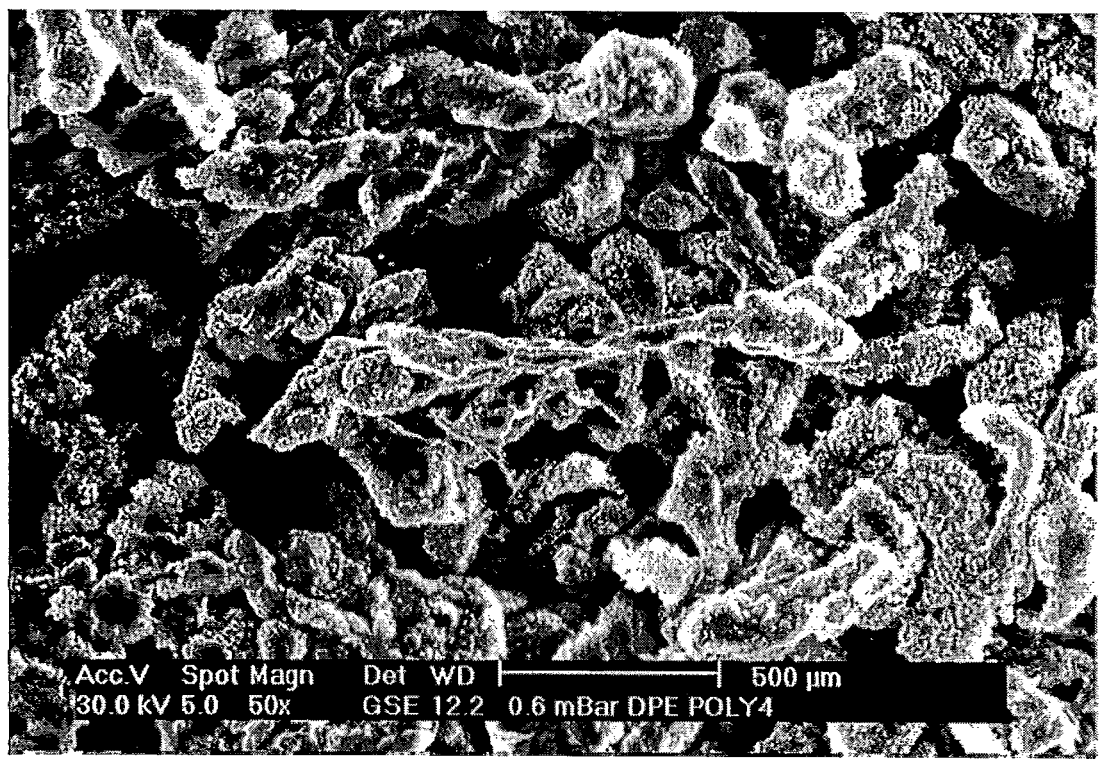
FIGS. 1 to 4 show the physical appearance of the polymer as seen from SEM studies.
Figure 2:
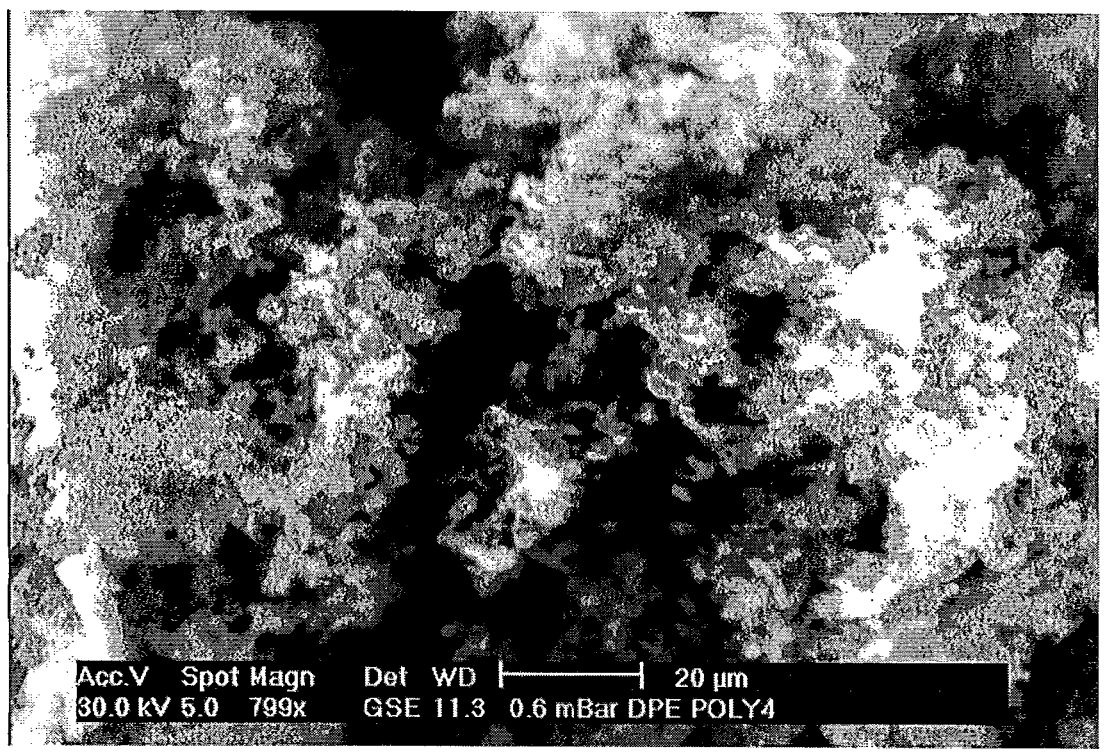
Figure 3:
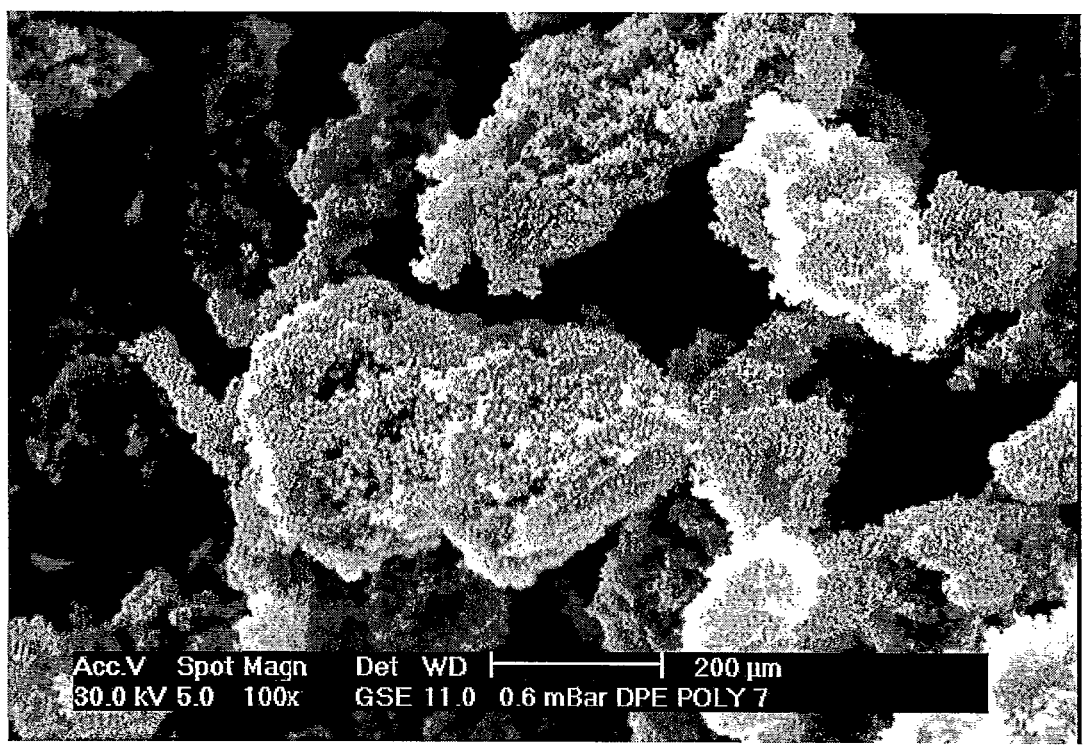
Figure 4:
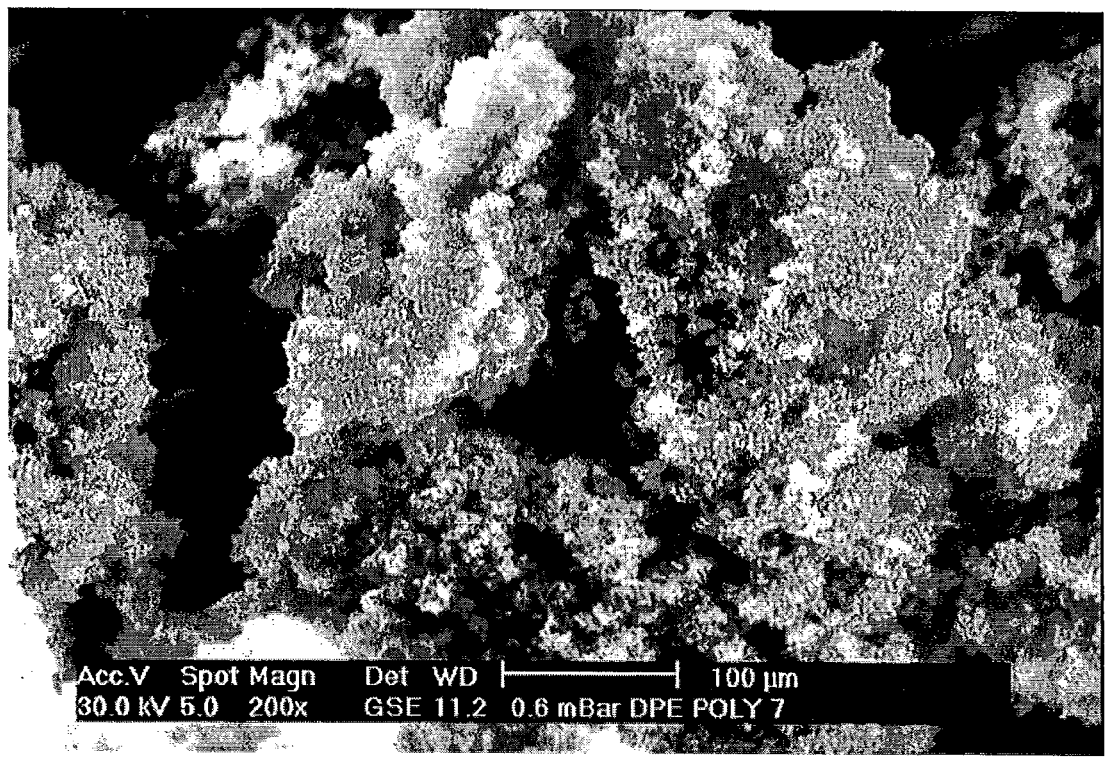

Use of homogeneous catalysts for the manufacture of disentangled ultra high molecular weight polyolefins, polyethylene in particular has been known. However, the use of homogeneous catalysts suffers from several drawbacks which include very high activity which makes it difficult to manage the process, enhanced sensitivity to catalytic poisons, fouling of reactors in commercial production set ups. Apart from these, handling of these catalysts during commercialization poses a tough practical challenge.

Amongst the heterogeneous catalysts, FI or FI type catalysts have become a preferred choice as polymerization catalyst in the manufacture of polyolefins for several reasons which include better control over the reaction, ability to produce polymers with a diverse molecular weight, improved bulk density, better adaptability in commercial plant set ups, ability to have diverse metal loading on the catalysts for more efficient tailoring of process, lesser susceptibility to catalytic poisoning, lower specific consumption of costly co-catalysts, etc.

Various supported and unsupported FI or FI type catalysts have been reported in the prior art. All the hitherto known FI catalysts are directly anchored physically on the support. However, such direct anchoring of the catalyst on a support has been known to reduce the catalytic efficiency of the catalyst. The physically adsorbed catalyst also has a tendency to leach out into the polymerization medium and consequently perform as an homogeneous catalyst which results in chemically nonequivalent type of polymers.

Various attempts have been made in the past to immobilize the homogeneous catalyst on a solid support but the performance of such catalyst has been reported to be inferior as compared to the homogeneous analogues. The reasons for the inferior performance of the immobilized heterogeneous catalysts are manifold, the major one being the formation of multiple types of ill-defined metal species on the solid support. There thus exists a need for synthetic methods that lead to the creation of uniform, isolated organometallic catalysts on the surfaces.

Against this backdrop, the present invention thus provides a single site heterogeneous FI or FI type catalyst, chemically immobilized on an inorganic oxide support represented by Formula I:

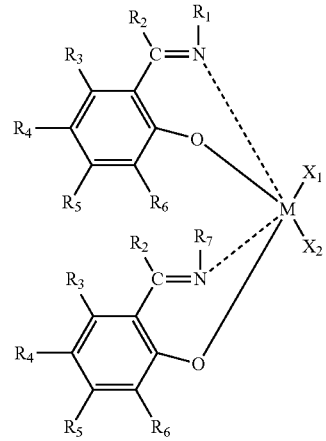

Formula I wherein, $R_1$ is independently

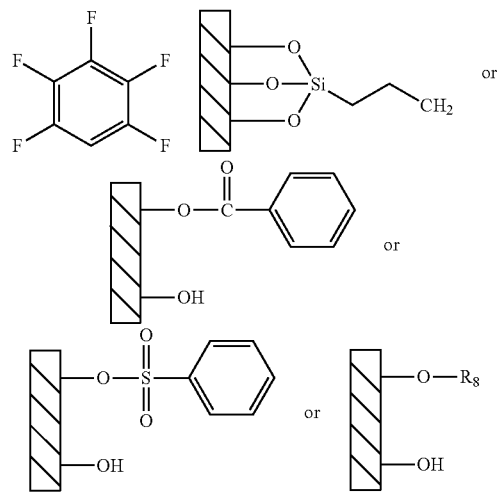

wherein $R_8$ is an entity that possesses carboxylic or sulphonic acid group.

$R_2$-$R_5$, are independently, H or a hydrocarbon;

$R_6$ is t-butyl;

$R_7$ is

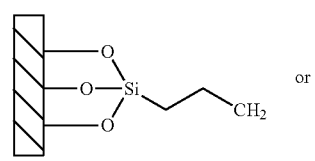

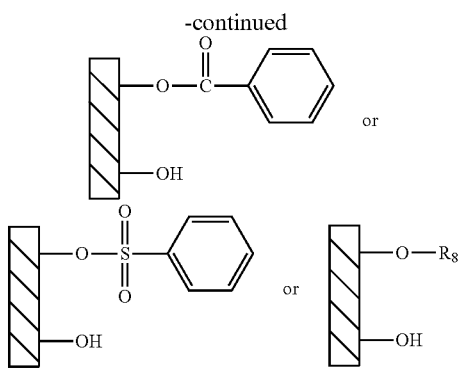

wherein R₈ is an entity having a carboxylic or sulphonic acid group.

$X_1$ and $X_2$ are independently F, Cl, Br or I.

M is a Group IV transition metal.

Direct immobilization of single site catalysts like FI catalyst, on inorganic oxide supports is not feasible because of the absence of suitable functional groups (1) on the surface of the inorganic oxide supports as well as (2) the FI catalyst to make a chemical reaction feasible. Further, direct attempts to immobilize FI catalysts on inorganic oxide supports results in deactivation of such catalysts due to reaction of the halide groups with the —OH groups in the support, since it is well known that —OH groups coordinate more strongly. This results in complete catalytic poisoning and it renders the catalyst inactive for olefin polymerization. This problem is overcome by the present inventors by devising a synthetic method wherein the —OH groups present in the inorganic oxide support are first suitably functionalized so as to enable reaction with suitable Schiff base chelating ligands thereby chemically immobilizing or supporting them. The process of the present invention thus renders the inorganic oxide support suitable for chemical immobilization of the single site homogeneous FI or FI type catalysts.

Accordingly, in another aspect of the present invention there is provided a synthetic method for immobilizing a single site FI or FI type catalyst on inorganic oxide support surfaces that comprises the following steps:

selecting an inorganic oxide support, functionalizing the support by treating it with a reagent to form a chemically bonded inorganic oxide support;

treating the functionalized inorganic oxide support with a substituted salicylaldehyde to obtain an inorganic oxide support with an immobilized phenoxy-imine based Schiff base chelating ligand;

lithiating the immobilized phenoxy-imine based Schiff base chelating ligand on the inorganic oxide support by treating it with a lithiating agent to obtain an inorganic oxide support with an immobilized lithiated Schiff base chelating ligand;

treating the inorganic oxide supported or immobilized lithiated Schiff base chelating ligand with a titanium halide compound to obtain an immobilized single site titanium chelate catalyst of the FI type.

A wide variety of supports may be employed for immobilizing the polymerization catalyst in accordance with the synthetic method of the present invention. Any material, organic, inorganic, bio-polymer having reactive —OH groups may be employed as a support. Thus, various types of supports that may be employed in accordance with the method of the present invention thus include an inorganic oxide support based on $SiO_2$, For example, ES70W procured from Ineos having the attributes like Surface Area=300 m²/g, Pore Volume=1.5 ml/g, spherical in nature with an average particle size diameter of 38 microns and a narrow particle size distribution.

All other silica based inorganic oxide supports with distinct and diverse physical and surface characteristics like MCM-41, MCM-48, SBA-15, MCF etc. are also suitable as supports for immobilization of catalysts in accordance with the present invention.

Apart from the above, the other types of materials that may also be used as support in accordance with the present invention include ion exchangers and organic polymeric dendrimers after suitable modifications.

Functionalizing the inorganic oxide support is a critical method step and the reagent employed in accordance with the synthesis method of the present invention include aminopropyl triethoxy silane, amino substituted carboxylic acids like anthranilic acid, amino substituted sulphonic acids of benzene, naphthalene etc. The idea is to enable reaction between the free —OH groups in the inorganic oxide supports with suitable groups like alkoxy as in amino propyl triethoxy silane; carboxylic acid or sulphonic acid as in anthranilic acid, benzene/naphthalene sulphonic acids etc. in the amino containing reagents so as to generate the "amino functionalized inorganic oxide support". The same has been illustrated below.

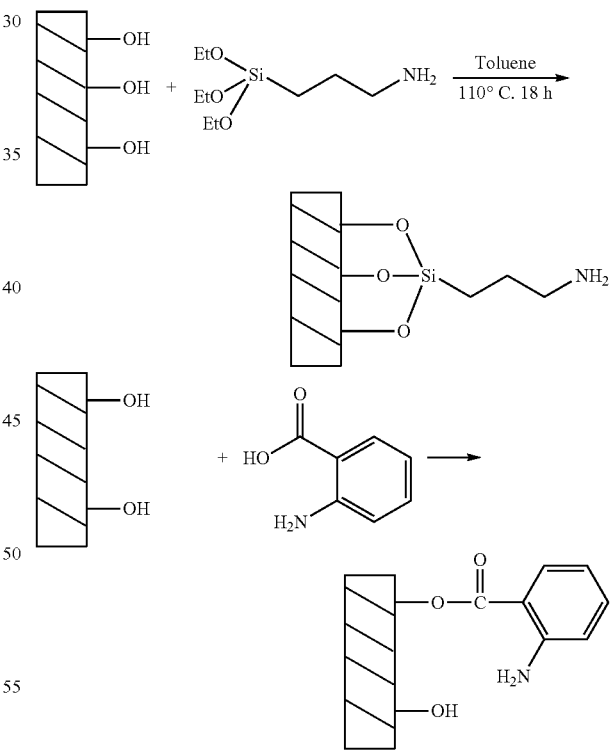

The amino group containing functionalized silica is then subsequently reacted with substituted salicylaldehydes which include 3-tert-butyl salicylaldehyde, 3,5-ditertiary butyl salicylaldehyde, 5-fluoro-3-methyl salicylaldehyde etc. including the un-substituted salicylaldehyde; 2-hydroxy-1-naphthaldehyde, etc. to generate the Schiff base imine ligand on the functionalized inorganic oxide support. The same has been illustrated below.

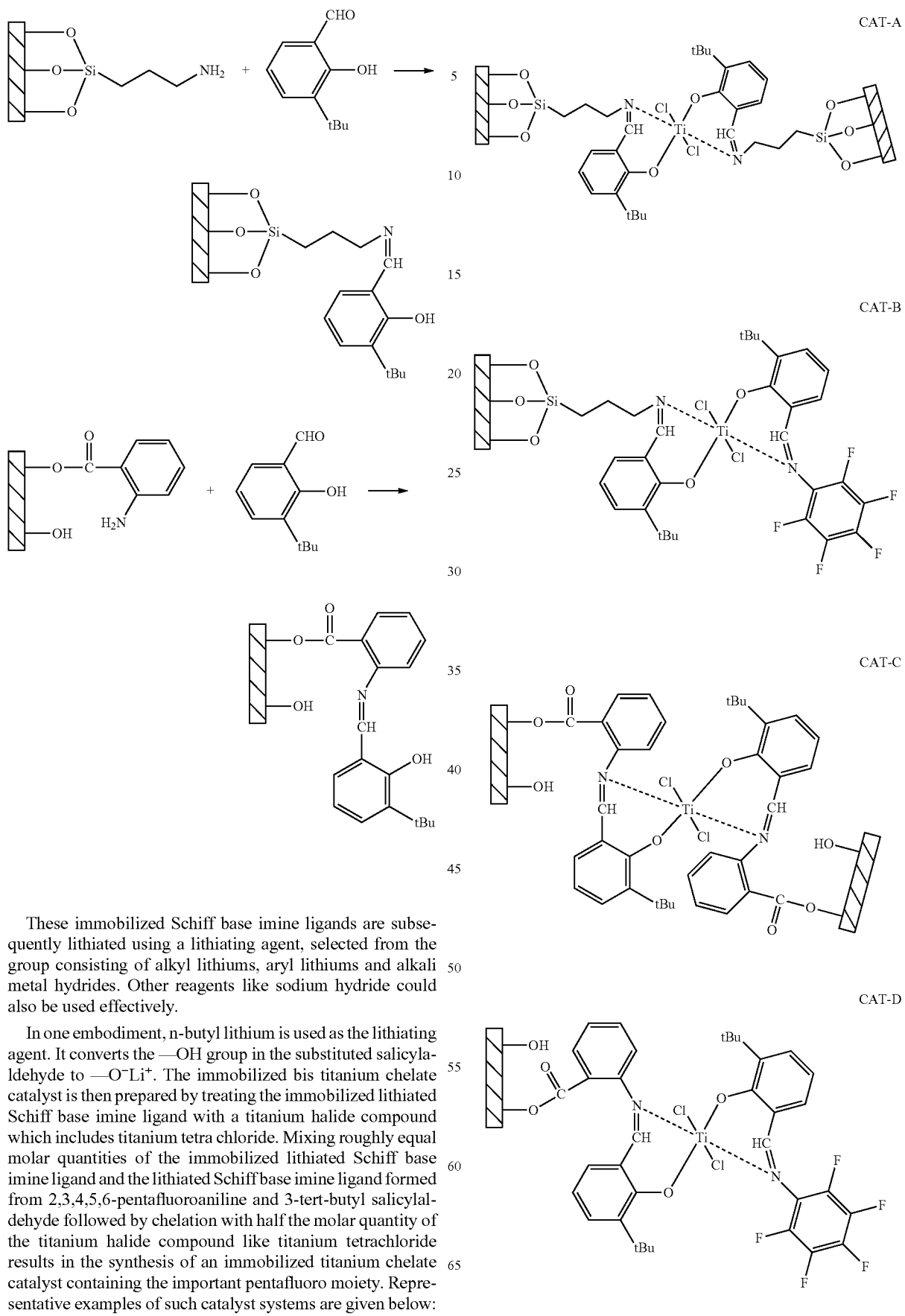

These immobilized Schiff base imine ligands are subsequently lithiated using a lithiating agent, selected from the group consisting of alkyl lithiums, aryl lithiums and alkali metal hydrides. Other reagents like sodium hydride could also be used effectively.

In one embodiment, n-butyl lithium is used as the lithiating agent. It converts the —OH group in the substituted salicylaldehyde to —O$^-$Li$^+$. The immobilized bis titanium chelate catalyst is then prepared by treating the immobilized lithiated Schiff base imine ligand with a titanium halide compound which includes titanium tetra chloride. Mixing roughly equal molar quantities of the immobilized lithiated Schiff base imine ligand and the lithiated Schiff base imine ligand formed from 2,3,4,5,6-pentafluoroaniline and 3-tert-butyl salicylaldehyde followed by chelation with half the molar quantity of the titanium halide compound like titanium tetrachloride results in the synthesis of an immobilized titanium chelate catalyst containing the important pentafluoro moiety. Representative examples of such catalyst systems are given below:

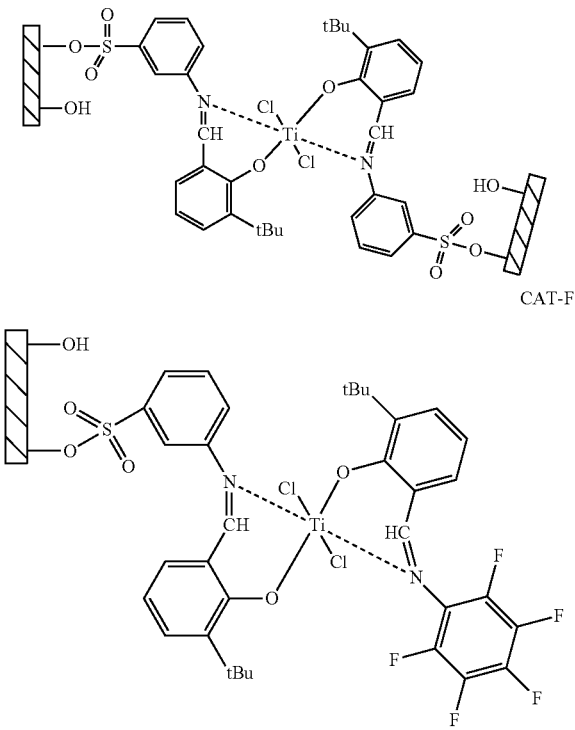

One of the most advantageous aspects of the immobilized single site heterogeneous polymerization catalysts of the present invention is that unlike the prior art catalysts they are not physically anchored over inorganic oxide supports. Therefore, these catalysts do not get deactivated quickly.

Still furthermore, the polymerization catalyst of the present invention also enhances the bulk density of the resultant UHMWPE by capitalizing on the diverse physico-chemical properties like surface area, porosity, average particle size, particle size distribution etc of the support. Apart from facilitating the increase in the bulk density of the resultant polymer, the selection of a suitable support along with process conditions can produce diverse range of polymers with varied characteristics by controlling the polymerization activity in a much better way.

In a still another aspect of the present invention, there is provided in accordance with the present invention, a process for synthesis of ultra-high molecular weight polyethylene (UHMWPE) with a molecular weight ranging between 0.1 million g/mole and 16 million g/mole by employing the surface immobilized single site heterogeneous polymerization catalyst of the present invention along with a co-catalyst. The process for synthesis of the UHMWPE using the immobilized polymerization catalyst of the present invention comprises the following steps:

To the dry and de-oxygenated polymerization medium like hexane, varsol (a mixture of hydrocarbons having boiling point in the range of 140-170° C.) or toluene is added a specific amount of the co-catalyst like P-MAO (poly methylaluminoxane) followed by the immobilized Ti containing catalyst of the present invention in such quantity so that the Al/Ti molar ratio as derived from the co-catalyst and catalyst is at least 200. This mixture is charged into a Buchi polyclave reactor under Nitrogen and subsequently agitated for different optimized time intervals under different optimized ethylene pressures ranging from atmospheric to about 8 bars, preferably higher pressures. The polymerization temperature is also optimized and ranged between 30 to 75° C. The polymer obtained during the run is filtered, washed with hexane and dried under vacuum for further characterization.

Typically, the co-catalyst used along with polymerization catalyst of the present invention in the process for synthesis of UHMWPE, is an aluminum alkyl. Such type of co-catalyst is known to produce disentangled polymeric chains. The aluminum alkyl co-catalysts employed in accordance with the process of the present invention include Poly methylaluminoxane (P-MAO), methylaluminoxane (MAO), triethyl aluminum (TEAL), triisobutyl aluminum (TIBA), isoprenyl aluminum (IPRA) and their mixtures in varied compositions.

Alternatively, the co-catalyst employed in accordance with the present invention is selected from the group consisting of different aluminum alkyls and their mixtures, the preferred one being poly methylaluminoxane (P-MAO).

The invention will now be described with the help of following non-limiting examples.

EXAMPLES

Preparation of Polymerization Catalysts (Catalysts A, C and E)

1.1 g of ES70W support which was dried in oven at 200° C. for 4 h to remove moisture and cooled under $N_2$ in glove bag was mixed with 1.5 g (~11 mmole) of anthranilic acid (FW 137; pale yellow powder). Added 50 to 60 ml of dry toluene and refluxed with magnetic stirring under $N_2$ atmosphere for 4-5 h; filtered hot (~90° C.) after allowing to settle; washed with hot toluene another two more times so that free anthranilic acid is removed; finally gave hexane/DCM wash twice and dried the functionalized support under $N_2$ in a glove bag to get a pale yellow brown free flowing powder. This was designated as stage A pre-catalyst viz the amino containing functionalized support. The entire quantity of pre-catalyst A was treated with 0.5 ml of 3-tert-butylsalicylaldehyde, 10-20 mg of PTSA, 50-60 ml of dry toluene and refluxed under gentle $N_2$ atmosphere for 4-5 h. The color progressively became more yellowish brown. The free 3-tert-butylsalicylaldehyde was removed through hot decantation and toluene wash, followed by hexane wash. Obtained a yellowish brown free flowing powder designated as stage B pre-catalyst viz the immobilized schiff base functionalized support. The entire quantity, ~1.2 g of pre-catalyst B, was lithiated in dry ether (50-60 ml) at −78° C. (dry ice+acetone mixture) using 2.5 ml (4 mmol) of nBuLi solution in hexane (1.6 molar; MW=64; d=0.68 g/ml); allowed lithiation to go to completion by raising temp to ~25-30° C., 2 hr. Removed excess of unreacted nBuLi by decanting off the ether layer; added fresh dry ether, 50-60 ml and magnetically stirred under $N_2$ at −78° C.; added 0.27 ml of neat $TiCl_4$ (2.5 mmol) at −78° C. and allowed the temp to reach ambient overnight. Obtained cream colored supported catalyst; washed with hexane/DCM/hexane to remove free catalyst, if any. Yield was ~1.55 g. Ti content in catalyst was measured and found to be 6.53%. 100 mg cat=0.1361 mmole of Ti. Appearance was pale yellow powder.

Preparation of Polymerization Catalysts (Catalysts B, D and F)

1.1 g of ES70W support which was dried in oven at 200° C. for 4 h to remove moisture and cooled under $N_2$ in glove bag was mixed with 1.5 g (~11 mmole) of anthranilic acid (FW 137; pale yellow powder). Added 50 to 60 ml of dry toluene and refluxed with magnetic stirring under $N_2$ atmosphere for 4-5 h; filtered hot (~90° C.) after allowing to settle; washed with hot toluene another two more times so that free anthranilic acid is removed; finally gave hexane/DCM wash twice and dried the functionalized support under $N_2$ in a glove bag to get a pale yellow brown free flowing powder. This was designated as stage A pre-catalyst viz the amino containing functionalized support. The entire quantity of pre-catalyst A was treated with 0.5 ml of 3-tert-butylsalicylaldehyde, 10-20 mg of PTSA, 50-60 ml of dry toluene and refluxed under gentle $N_2$ atmosphere for 4-5 h. The color progressively became more yellowish brown. The free 3-tert-butylsalicylaldehyde was removed through hot decantation and toluene wash, followed by hexane wash. Obtained a yellowish brown free flowing powder designated as stage B pre-catalyst viz the immobilized schiff base functionalized support. The entire quantity, ~1.2 g of pre-catalyst B, was lithiated in dry ether (50-60 ml) at −78° C. (dry ice+acetone mixture) using 2.5 ml (4 mmol) of nBuLi solution in hexane (1.6 molar; MW=64; d=0.68 g/ml); allowed lithiation to go to completion by raising temp to ~25-30° C., 2 hr. Removed excess of unreacted nBuLi by decanting off the ether layer; added fresh dry ether, 50-60 ml and magnetically stirred under $N_2$ at −78° C. Separately lithiated 0.7 g of the Schiff base derived from 2,3,4,5,6-pentafluoroaniline (PFA) and 3-tert-butylsalicylaldehyde using 1.25 ml (2 mmol) of nBuLi solution in 50 ml of dry ether at −78° C. for 1 h and then allowing the process to go to completion at room temperature for 2 h. Mixed both the lithiated species for 10-15 min at −78° C. under magnetic stirring and titanated using 0.50 ml (4.6 mmol) of neat $TiCl_4$; colour changed to brown; continued overnight to reach room temperature; allowed to settle and decanted off ether layer; washed immobilized catalyst with ether; hexane few times and dried under $N_2$. Yield was ~2.9 g. Ti content was estimated as 5.73%. 100 mg cat was equivalent to 0.1194 mmole of Ti. Appearance was pale yellow brown powder.

Synthesis of the other catalysts was performed in a similar manner employing the respective reagents.

The above synthesis of UHMWPE/DUHMWPE using the different catalyst/co-catalyst systems is tabulated below.

TABLE 1

Entry at 4# is with CAT-A, all other entries are with CAT-B; time is 2 hr unless mentioned otherwise. Polymerizations performed in 1 L Buchi polyclave reactor with P-MAO as co-catalyst.

| No. | Cat qty (g) | mmol of Ti | Al/Ti mole ratio | Ethylene pressure (atm) | Temp. (° C.) | Solvent (0.5 L) | D-UHMWPE (g) | D-UHMWPE (g/g of cat.) | D-UHMWPE (g/mmol of Ti) | RSV (dl/g) | ASTM Avg. M. Wt. (g/mol) in millions |
|---|---|---|---|---|---|---|---|---|---|---|---|
| 1 | 0.272 | 0.162 | 43 | 5 | 75 | Hexane | 1.3 | 5 | 8 | 8.8 | 1.1 |
| 2 | 0.272 | 0.162 | 130 | 5 | 42 | Hexane | 30.5 | 112 | 189 | 22.3 | 3.8 |
| 3 | 0.272 | 0.162 | 173 | 5 | 42 | Hexane | 28.2 | 104 | 175 | 25.7 | 4.6 |
| 4# | 0.150 | 0.163 | 129 | 5 | 45 | Hexane | 11.5 | 77 | 71 | 16.2 | 2.4 |
| 5 | 0.272 | 0.162 | 108 | 5 | 47 | Hexane | 30 | 110 | 186 | 25 | 4.4 |
| 6 | 0.272 | 0.162 | 86 | 5 | 45 | Hexane | 28 | 103 | 173 | 29.7 | 5.6 |
| 7 | 0.272 | 0.162 | 98 | 5 | 40 | Hexane | 22.3 | 82 | 138 | 27.7 | 5.1 |
| 8 | 0.272 | 0.162 | 101 | 5 | 43 | Varsol | 25.2 | 93 | 156 | 17.6 | 2.7 |
| 9 | 0.272 | 0.162 | 101 | 5 | 37 | Toluene | 11 | 40 | 68 | 56.8 | 13.6 |
| 10 | 0.272 | 0.162 | 202 | 5 | 50 | Toluene | 47 | 173 | 291 | 54 | 12.7 |
| 11 | 0.136 | 0.081 | 202 | 7 | 45 | Toluene | 33 | 243 | 409 | 54 | 12.7 |
| 12 | 0.136 | 0.081 | 202 | 7 | 45 | Toluene | 12.5 (20 min) | 92 | 155 | 46.6 | 10.4 |
| 13 | 0.136 | 0.081 | 202 | 7 | 45 | Toluene | 14.5 (40 min) | 107 | 180 | 55.5 | 13.2 |
| 14 | 0.136 | 0.081 | 202 | 7 + 0.1 bar H2 | 42 | Toluene | 17 (20 min) | 125 | 211 | 61 | 15 |
| 15 | 0.136 | 0.081 | 202 | 7 | 35 | Toluene | 5 (5 min) | 37 | 62 | 44.5 | 9.7 |
| 16 | 0.272 | 0.162 | 65 | 7 | 35 | Toluene | 12 (5 min) | 44 | 74 | 52.1 | 12.1 |
| 17 | 0.272 | 0.162 | 130 | 7 | 45 | Varsol | 15 | 55 | 93 | Very high | Very high |

TABLE 2

Entries from 1 to 3 are with CAT-C, whereas all other entries are with CAT-D; time is 2 hr unless mentioned otherwise. Polymerizations performed in 1 L Buchi polyclave reactor with P.MAO as co-catalyst, unless mentioned otherwise.

| No. | Cat qty (g) | mmol of Ti | Al/Ti mole ratio | Ethylene pressure (atm) | Temp. (° C.) | Solvent (0.5 L) | D-UHMWPE (g) | D-UHMWPE (g/g of cat.) | D-UHMWPE (g/mmol of Ti) | RSV (dl/g) | ASTM Avg. M. Wt. (g/mol) in millions |
|---|---|---|---|---|---|---|---|---|---|---|---|
| 1 | 0.060 | 0.082 | 200 | 7 | 50 | Hexane | 4 | 67 | 49 | 17.8 | 2.8 |
| 2 | 0.060 | 0.082 | 18 (TEAL) | 7 | 80 | Hexane | 1.5 | 25 | 18 | 39 | 8.1 |
| 3 | 0.060 | 0.082 | 200 | 7 | 75 | Toluene | 0 | 0 | 0 | — | — |
| 4 | 0.069 | 0.082 | 198 | 7 | 60 | Hexane | 1.2 | 17 | 15 | ND | ND |
| 5 | 0.140 | 0.167 | 146 | 7 | 75 | Varsol | 8 | 57 | 48 | 21 | 3.5 |
| 6 | 0.140 | 0.167 | 18 (TEAL) | 7 | 75 | Hexane | 5.5 | 39 | 33 | 45.9 | 10.1 |
| 7 | 0.140 | 0.167 | 195 | 7 | 40 | Toluene | 27 | 193 | 161 | 53.4 | 12.5 |
| 8 | 0.140 | 0.167 | 104 | 7 | 40 | Toluene | 8.5 | 61 | 51 | 52 | 12.1 |
| 9 | 0.140 | 0.167 | 18 (TEAL) | 7 | 75 | Toluene | 7 | 50 | 42 | 52 | 12.1 |
| 10 | 0.140 | 0.167 | 36 (TEAL) | 7 | 75 | Toluene | 6 | 43 | 36 | ND | ND |
| 11 | 0.140 | 0.167 | 146 | 7 | 42 | Toluene | 14 | 100 | 84 | ND | ND |

TABLE 3

Entry at 1 is with CAT-E, whereas all other entries are with CAT-F; time is 2 hr unless mentioned otherwise. Polymerizations performed in 1 L Buchi polyclave reactor with P.MAO as co-catalyst, unless mentioned otherwise.

| No. | Cat qty (g) | mmol of Ti | Al/Ti mole ratio | Ethylene pressure (atm) | Temp. (° C.) | Solvent (0.5 L) | D-UHMWPE (g) | D-UHMWPE (g/g of cat.) | D-UHMWPE (g/mmol of Ti) | RSV (dl/g) | ASTM Avg. M. Wt. (g/mol) in millions |
|---|---|---|---|---|---|---|---|---|---|---|---|
| 1 | 0.240 | 0.168 | 194 | 7 | 40 | Toluene | 6.5 | 27 | 39 | ND | ND |
| 2 | 0.170 | 0.169 | 103 | 7 | 40 | Toluene | 4 | 24 | 24 | 53.4 | 12.5 |
| 3 | 0.170 | 0.169 | 103 | 7 | 40 | Varsol | 5 | 29 | 30 | 53.4 | 12.5 |

Figure 5:
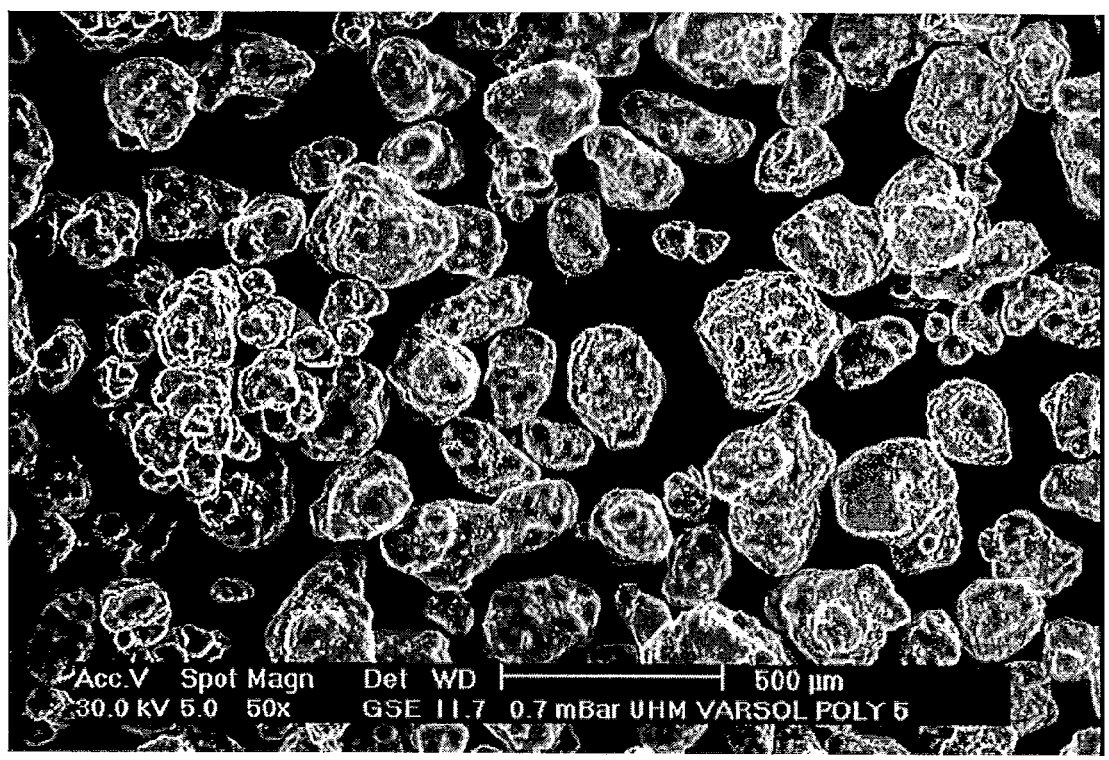
FIG. 5 shows SEM of a normal UHMWPE which has a bulk density of ~0.4 g/cc and a solid morphology—absence of porous features.

The bulk density of the polymers synthesized using such immobilized catalysts was more than the bulk density of the polymer synthesized using the un-supported FI catalyst. The bulk density increased from a normal value ranging between ~0.05-0.07 g/cc to ~0.10 to 0.15; i.e. by a factor of 2 to 3. The physical appearance of the polymer as seen from SEM studies reflected elongated particles, porous in nature. The same is illustrated in FIGS. 1 to 5. The SEM as shown in FIG. 5 is that of a normal UHMWPE which has a bulk density of ~0.4 g/cc and a solid morphology—absence of porous features.

The DSC results and the calculated crystallinity from XRD measurements are provided in the Table below:

| Polymer | MW (Million) | Crystallinity (%) X-ray | Crystallinity (%) DSC | Melting Endotherm Tm1 (° C.) | Melting Endotherm ΔHTm1 (J/g) |
|---|---|---|---|---|---|
| Poly-1 | 5.6 | 77.27 | 49.33 | 141 | 146 |
| Poly-2 | 3.9 | 81.48 | 66.55 | 142 | 195 |
| Poly-3 | 3.8 | 86.95 | 74.74 | 142 | 219 |
| Poly-4 | 5.4 | 79.16 | 63.13 | 143 | 185 |
| Poly-5 | 5.2 | 94.44 | 59.72 | 142 | 175 |
| Poly-6 (UHMWPE) | 4.1 | 58.33 | 47.60 | 134 | 139 |

The above results are only for illustration purpose and to bring out the difference between DUHMWPE and normal UHMWPE. Polymers could be produced with different properties by varying the process conditions. DUHMWPE has higher melting endotherm and also has a higher crystallinity.

Figure 6:
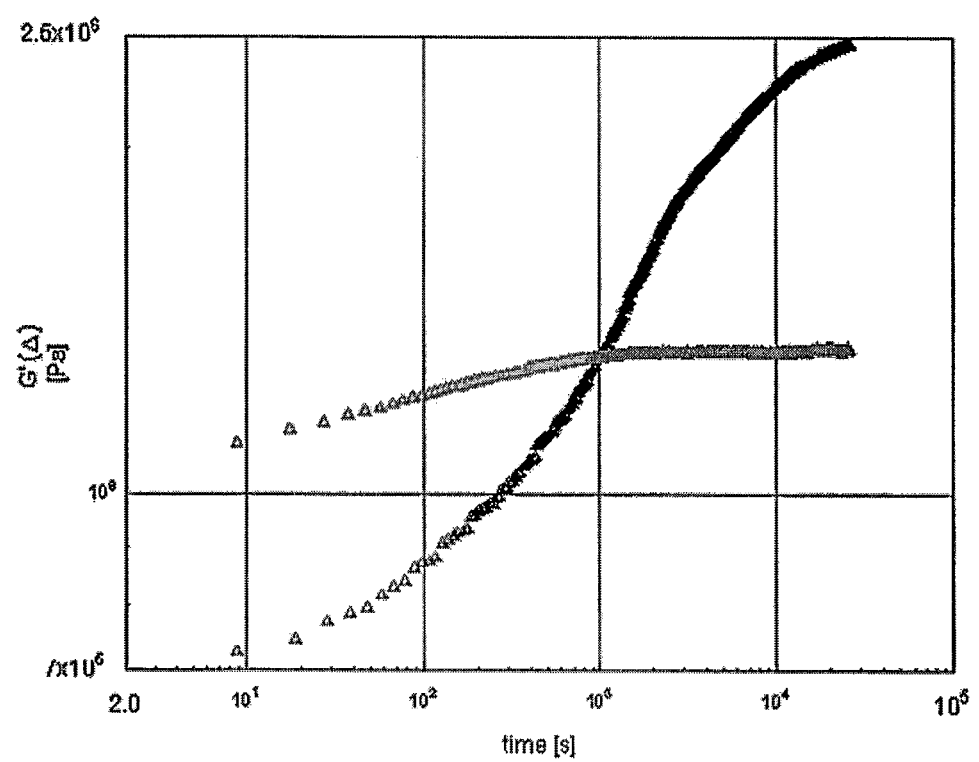
FIG. 6 provides a graph that shows the comparative rheological data for normal and disentangled UHMWPE

The comparative rheological data for normal and disentangled UHMWPE is shown in the graph provided in FIG. 6. The curve for D-UHMWPE obtained with the catalysts of invention clearly shows the expected buildup of modulus.

While certain embodiments of the inventions have been described, these embodiments have been presented by way of example only, and are not intended to limit the scope of the inventions. Variations or modifications to the design and construction of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

The invention claimed is:

1. A chemically immobilized heterogeneous single site polymerization catalyst represented by Formula I:

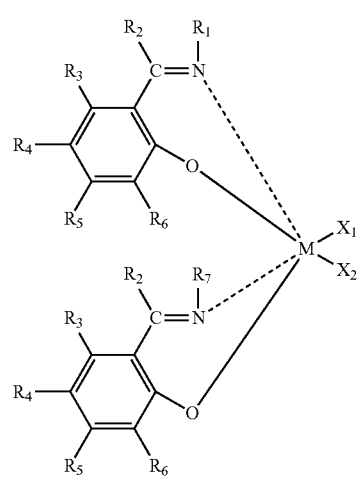

Formula I wherein,
M is a Group IV transition metal;
$R_1$ is

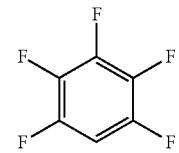 [SMILES: Fc1cc(F)c(F)c(F)c1F]

or
a functionalized inorganic oxide support selected from the group consisting of

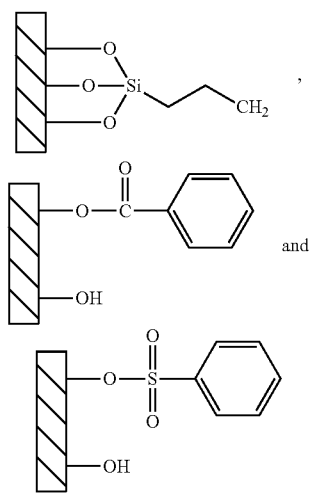

and $R_2$-$R_5$, are independently, H or a hydrocarbon;
$R_6$ is t-butyl;
$R_7$ is a functionalized inorganic oxide support selected from the group consisting of

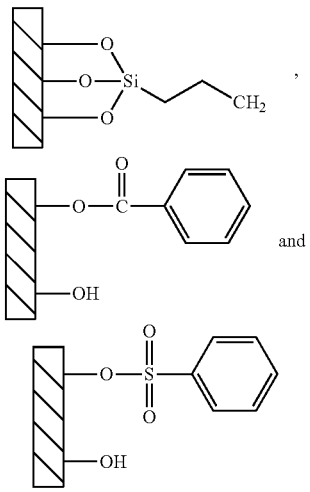

and $X_1$ and $X_2$ are independently F, Cl, Br or I.

2. The chemically immobilized heterogeneous single site polymerization catalyst as claimed in claim 1, wherein the group IV transition metal, M is titanium.

3. A method for chemically immobilizing a single site phenoxy-imine (FI) or phenoxy-imine based catalyst on an inorganic oxide support, through covalent bonding, said method comprising the following steps:
selecting an inorganic support,
functionalizing the support by treating it with a reagent to obtain a chemically bonded amino functionalized inorganic oxide support;
treating the amino functionalized inorganic oxide support with a substituted salicylaldehyde to obtain an inorganic oxide support with an immobilized phenoxy-imine based Schiff base chelating ligand;
lithiating the immobilized phenoxy-imine based Schiff base chelating ligand on the inorganic oxide support by treating it with a lithiating agent to obtain an inorganic oxide support with an immobilized lithiated Schiff base chelating ligand; and
treating the inorganic oxide support with immobilized lithiated Schiff base chelating ligand with a titanium halide compound to obtain an immobilized single site titanium chelate catalyst.

4. The method as claimed in claim 3, wherein the inorganic oxide support is selected from the group consisting of silica, zeolite, alumina and ion exchangers.

5. The method as claimed in claim 3, wherein the reagent is at least one selected from the group consisting of amino alkyl or amino aryl trialkoxy silanes and amino substituted carboxylic and sulphonic acids.

6. The method as claimed in claim 3, wherein the substituted salicylaldehyde is at least one selected from the group consisting of one, two or more benzene rings with an ortho hydroxyl group adjacent to the aldehyde group.

7. The method as claimed in claim 3, wherein the lithiating agent is selected from the group consisting of alkyl lithiums, aryl lithiums and alkali metal hydrides.

8. The method as claimed in claim 3, wherein the lithiating agent is n-butyl lithium.

9. The method as claimed in claim 3, wherein the titanium halide compound is titanium tetrachloride.

10. A process for synthesis of ultra-high molecular weight polyethylene(UHMWPE) with a molecular weight ranging between 0.1 and 16 million g/mole by employing a surface immobilized single site heterogeneous polymerization catalyst represented by Formula I along with a co-catalyst, wherein Formula I is,

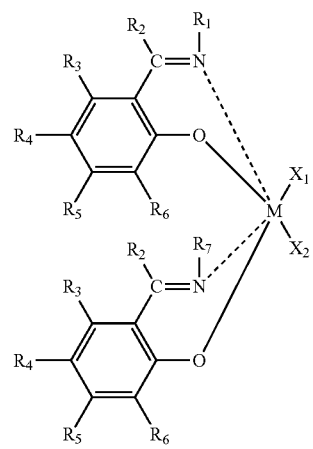

wherein,
M is a Group IV transition metal;
$R_1$ is

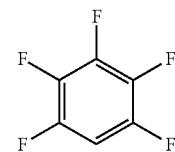

or
a functionalized inorganic oxide support selected from the group consisting of

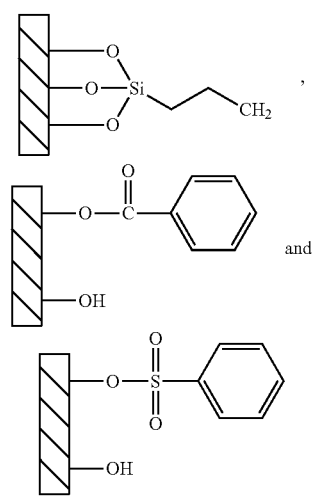

$R_2$-$R_5$, are independently, H or a hydrocarbon;
$R_6$ is t-butyl;

$R_7$ is a functionalized inorganic oxide support selected from the group consisting of

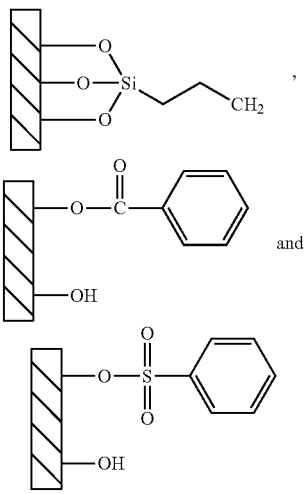

and $X_1$ and $X_2$ are independently F, Cl, Br or I;
said process comprising the following steps:
mixing a co-catalyst and the surface immobilized heterogeneous polymerization catalyst represented by Formula I, under nitrogen or argon in an inert, dry and oxygen free hydrocarbon solvent to obtain a mixture with a pre-determined Al/Ti ratio; and
polymerizing ethylene in presence of the mixture in a polyclave reactor under mechanical agitation to obtain UHMWPE polymer.

11. The process as claimed in claim 10, wherein the co-catalyst is at least one selected from the group consisting of poly methylaluminoxane (P-MAO), triethyl aluminum (TEAL), and methyl aluminoxane (MAO).

12. The process as claimed in claim 10, wherein the Al/Ti molar ratio as derived from the co-catalyst and catalyst is at least 200.

13. The process as claimed in claim 10, wherein the ethylene pressure in the reactor is maintained in the range between atmospheric pressure and about 8 bar.

14. The process as claimed in claim 10, wherein the polymerization temperature is maintained in the range of about 30 to 75° C.

15. The process as claimed in claim 10, wherein the hydrocarbon solvent is at least one selected from the group consisting of hexane, a mixture of aliphatic and alicyclic $C_7$ to $C_{12}$ hydrocarbons and toluene.

* * * * *